United States Patent
Örthagen et al.

(10) Patent No.: US 9,978,372 B2
(45) Date of Patent: May 22, 2018

(54) METHOD AND DEVICE FOR ANALYZING DATA FROM A MICROPHONE

(71) Applicant: Sony Mobile Communications Inc., Tokyo (JP)

(72) Inventors: Sven Örthagen, Staffanstorp (SE); Yiran Sun, Tygelsjö (SE); Anders Wikander, Göteborg (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days. days.

(21) Appl. No.: 15/281,727

(22) Filed: Sep. 30, 2016

(65) Prior Publication Data
US 2017/0169826 A1    Jun. 15, 2017

(30) Foreign Application Priority Data
Dec. 11, 2015 (EP) .................................... 15199546

(51) Int. Cl.
| | |
|---|---|
| *G10L 15/30* | (2013.01) |
| *H04R 29/00* | (2006.01) |
| *G10L 15/18* | (2013.01) |
| *G10L 15/16* | (2006.01) |
| *G10L 15/08* | (2006.01) |

(Continued)

(52) U.S. Cl.
CPC .......... *G10L 15/30* (2013.01); *G10L 15/1815* (2013.01); *H04R 29/004* (2013.01); *G10L 17/06* (2013.01); *G10L 2015/088* (2013.01); *H04L 67/10* (2013.01)

(58) Field of Classification Search
CPC ...................................................... G10L 15/30
See application file for complete search history.

(56) References Cited

U.S. PATENT DOCUMENTS

| | | | |
|---|---|---|---|
| 5,790,427 A | | 8/1998 | Greer |
| 5,960,399 A | * | 9/1999 | Barclay .................. G10L 15/02 370/349 |

(Continued)

FOREIGN PATENT DOCUMENTS

| | | |
|---|---|---|
| WO | 2008/124786 A2 | 10/2008 |
| WO | 2012/135293 A2 | 10/2012 |
| WO | 2014/015031 A1 | 1/2014 |

OTHER PUBLICATIONS

Extended European Search Report from corresponding European Patent Application No. 15199546.1, dated Jun. 1, 2016.

*Primary Examiner* — Brian L Albertalli
(74) *Attorney, Agent, or Firm* — Tucker Ellis LLP (57) ABSTRACT

A method for analyzing data from a microphone, the microphone being arranged to continuously record audio data, the method comprising: continuously storing the recorded audio data in a buffer, receiving a first triggering signal at a first point in time, the first triggering signal pertaining to a request for analyzing the audio data presently being recorded by the microphone, transferring a predefined amount of recorded audio data stored prior to the first point in time and audio data stored after the first point in time to a conversation analyzing unit. The method is advantageous as the information that was momentarily available during a conversation in the form of sound waves is now analyzed and thus may be converted to a format compatible with information available from other sources of relevance to the user.

12 Claims, 4 Drawing Sheets

(51) Int. Cl.
*H04L 29/08* (2006.01)
*G10L 17/06* (2013.01)

(56) References Cited

U.S. PATENT DOCUMENTS

| | | | |
|---|---|---|---|
| 8,964,946 B1* | 2/2015 | Scheet | G10L 15/26 379/88.01 |
| 2003/0040917 A1* | 2/2003 | Fiedler | G11B 20/10527 704/500 |
| 2004/0156616 A1 | 8/2004 | Strub | |
| 2004/0183912 A1 | 9/2004 | Szolyga | |
| 2006/0241948 A1* | 10/2006 | Abrash | G10L 25/87 704/275 |
| 2007/0249406 A1* | 10/2007 | Andreasson | H04M 1/656 455/563 |
| 2008/0162454 A1* | 7/2008 | Lundell | G06F 17/3002 |
| 2009/0051768 A1 | 2/2009 | Dekeyser | |
| 2009/0292526 A1* | 11/2009 | Harari | G06F 17/2765 704/9 |
| 2009/0327263 A1* | 12/2009 | Maghoul | G06F 17/30654 |
| 2010/0158213 A1* | 6/2010 | Mikan | H04M 3/42221 379/88.14 |
| 2010/0246784 A1* | 9/2010 | Frazier | H04L 65/1083 379/88.13 |
| 2011/0044438 A1* | 2/2011 | Wang | H04W 4/206 379/93.02 |
| 2011/0238191 A1* | 9/2011 | Kristjansson | G06F 1/1626 700/94 |
| 2012/0035931 A1* | 2/2012 | LeBeau | G10L 15/265 704/251 |
| 2014/0081637 A1* | 3/2014 | Wren | G10L 19/018 704/246 |
| 2015/0149171 A1* | 5/2015 | Goldman | G10L 15/26 704/235 |
| 2015/0228281 A1* | 8/2015 | Raniere | G06F 3/167 704/275 |

* cited by examiner

METHOD AND DEVICE FOR ANALYZING DATA FROM A MICROPHONE

TECHNICAL FIELD

The invention relates generally to a method and device for analyzing data from a microphone.

BACKGROUND

In all different kinds of situations, especially during a lunch or coffee break, people often talk informally about things that they have heard, seen or thought about. Some of the information is usually of interest to the other listeners. It would be advantageous to recall the topics from the conversation so that the information can be automatically retrieved or shared at a later time when/where it is needed. One way to realize the above mentioned idea is to record audio data from the conversation, subsequently storing the data for later retrieval, where the recording preferably being realized by a portable device easily brought to the get-together of interest. Devices capable of recording audio data is known in the art, and for the above mentioned purpose an example is WO 2014/015031, this reference describing a wrist-wearable device capable of recording audio data for later retrieval.

A problem with the prior art solutions is that the user cannot use the information retrieved from a get-together in combination with information of any other kind available on any other device or entity, for the reason of incompatibility between recorded audio data and the data on the any other device or entity.

SUMMARY

It is an object of the present invention to mitigate the above mentioned problem, and to provide a method for analyzing audio data and a device for recording and processing said data, the method and device providing an improved compatibility between the data collected from a conversation and other data stored elsewhere of relevance to the user.

This and other problems are solved by providing a method for analyzing data from a microphone, wherein the data can be automatically analyzed using a conversation analyzing unit, the output from which will be compatible with data available from other sources of relevance to the user.

According to a first aspect of the invention, a method for analyzing data from a microphone is provided where the microphone is arranged to continuously record audio data. The method comprises continuous storing of the recorded audio data in a buffer. When receiving a first triggering signal at a first point in time, the first triggering signal pertaining to a request for analyzing the audio data presently being recorded by the microphone, a predefined amount of recorded audio data stored prior to the first point in time and audio data stored after the first point in time is transferred to a conversation analyzing unit.

This method can be advantageous as the information that was momentarily available during a conversation in the form of sound waves is now analyzed and thus may be converted to a format compatible with information available from other sources of relevance to the user.

According to one embodiment of the invention, the method further comprises receiving a second triggering signal at a second point in time, the second point in time being subsequent to the first point in time, where said second point in time is defining the end of the audio data stored after the first point in time that will be sent to the conversation analyzing unit.

According to one embodiment of the invention, the buffer is arranged to store the recorded audio data on a first-in-first-out, FIFO, basis.

According to one embodiment of the invention, the conversation analyzing unit uses one or more of speech analysis, keyword analysis, semantic analysis, topic analysis, voice detection, natural language processing algorithms, text mining, machine learning models and personalized settings. The conversation analyzing unit then outputs data based on the one or more listed operations.

According to one embodiment of the invention, the first triggering signal is generated as a result of one from the list of: pressing a button, detecting a vibration, detecting a voice command, detecting a predefined variation in tilt of a device comprising the microphone, pressing a touch screen of a device comprising the microphone, tapping the device comprising the microphone, shaking the device comprising the microphone and/or squeezing the device comprising the microphone.

According to one embodiment of the invention, the conversation analyzing unit is arranged to continuously receive audio data recorded from the microphone, wherein the first triggering signal is generated as a result of identifying a specific piece of data in the output from the conversation analyzing unit.

According to one embodiment of the invention, the first triggering signal is generated as a result of an input from the list above, performed on a device which is wired or wirelessly connected to the device comprising the microphone.

According to one embodiment of the invention, the second triggering signal is generated as a result of one from the list of: pressing a button, detecting a vibration, detecting a predefined variation in tilt of a device comprising the microphone, pressing a touch screen of a device comprising the microphone, tapping the device comprising the microphone, shaking the device comprising the microphone, squeezing the device comprising the microphone, identifying a specific piece of data in the output from the conversation analyzing unit, reaching a predefined time duration of the recording.

According to one embodiment of the invention, the method further comprises transmitting data to an external processing and/or storage device, wherein the data to be transmitted is the recorded audio data from the microphone and/or data output from the conversation analyzing unit.

According to one embodiment of the invention, the conversation analyzing unit processes the recorded audio data to extract new keywords from the recorded audio data, the new keywords being added to the existing list of keywords.

According to one embodiment of the invention, the conversation analyzing unit processes the recorded audio data to identify voices in the recorded audio data, wherein at least some of the new keywords is associated with a specific voice. The method further comprises presenting for the user the option of sharing recorded audio data and/or data output from conversation analyzing unit after having processed said recorded audio data, to a person associated with the voice.

According to one embodiment of the invention, the processed data output from the conversation analyzing unit is used for triggering content search on internet and/or specific databases, wherein the result from the content search is stored for later retrieval.

According to one embodiment of the invention, the processed data output from the conversation analyzing unit is used for generating invitations and/or updates to information stored pertaining to persons other than the user.

According to one embodiment of the invention, suggestions and/or actions are triggered as a result from a combination of output from the conversation analyzing unit and one or more from the list of: geographical coordinate information, calendar information, social network status, weather information, current user activity and/or detected sensor data pertaining to the user.

According to one embodiment of the invention, at least part of the recorded data is intermediately stored in a second buffer before transmitting it to the conversation analyzing unit.

According to a second aspect of the invention, a computer program product comprising a computer-readable storage medium with instructions adapted to carry out the method of the first aspect when executed by a device having processing capability.

According to a third aspect of the invention, a device for analyzing data from a microphone is provided. The device comprises a microphone being arranged to continuously record audio data, a buffer, a processor arranged to continuously store the recorded audio data in the buffer, receive a first triggering signal at a first point in time, the first triggering signal pertaining to a request for analyzing the audio data presently being recorded by the microphone, transfer a predefined amount of recorded audio data stored prior to the first point in time and audio data stored after the first point in time to a conversation analyzing unit.

According to one embodiment of the invention, the recorded audio data is transferred to one from the list of: a computer storage medium, a wireless transferring circuitry arranged to transmit the recorded audio data to a secondary device.

The second and third aspect may generally have the same features and advantages as the first aspect.

Further possible features and benefits of this solution will become apparent from the detailed description below. Please note that any aspect or part of aspect as well as any method or part of method could be combined in any way.

BRIEF DESCRIPTION OF DRAWINGS

Examples of embodiments herein are described in more detail with reference to attached drawings in which.

DETAILED DESCRIPTION

Embodiments will now be described with reference to FIGS. 1, 2 and 3.

Figure 1:
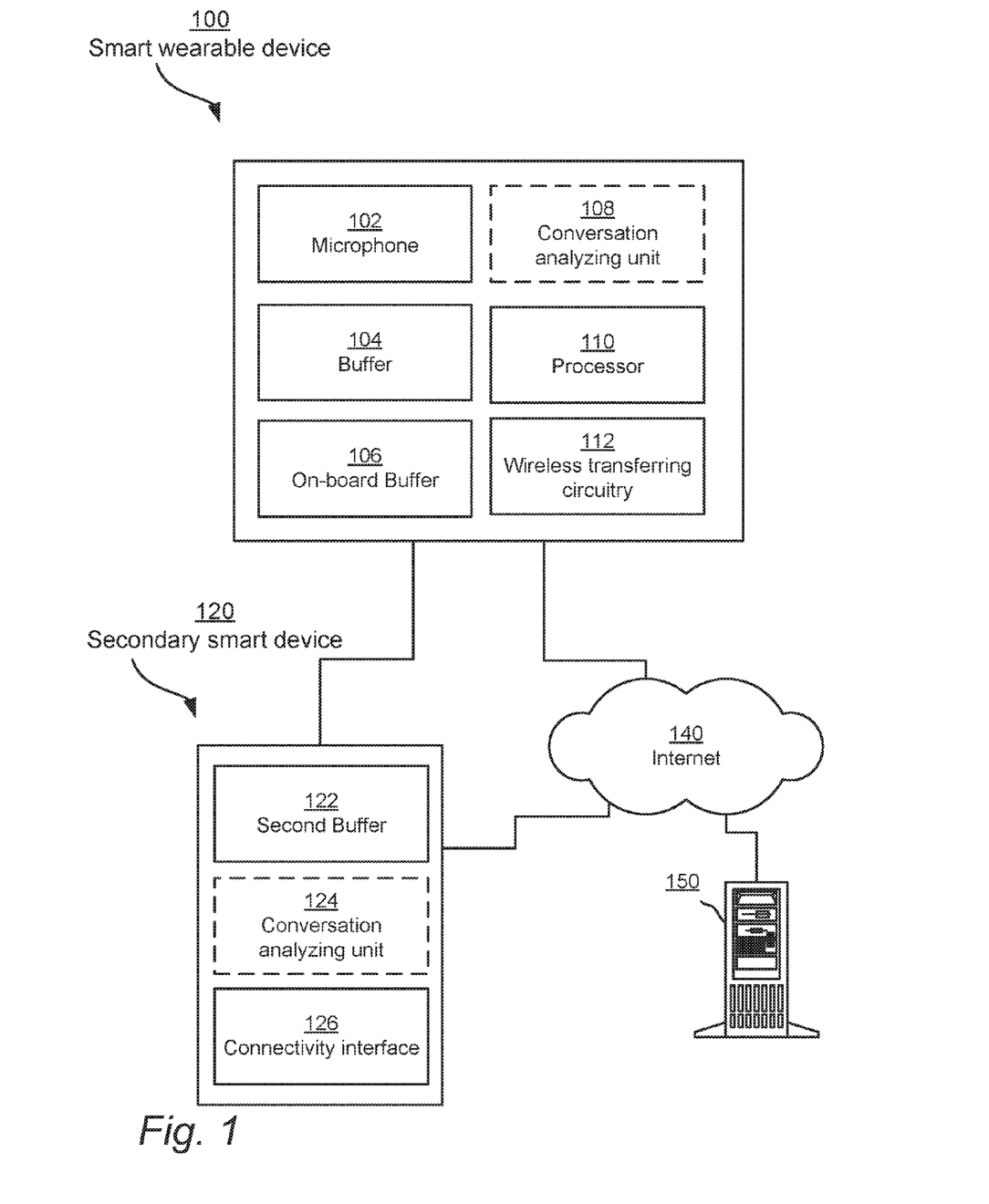
FIG. 1 is a schematic block diagram illustrating the smart wearable device and other devices to which the smart wearable device connects according to some embodiments.
Figure 2:
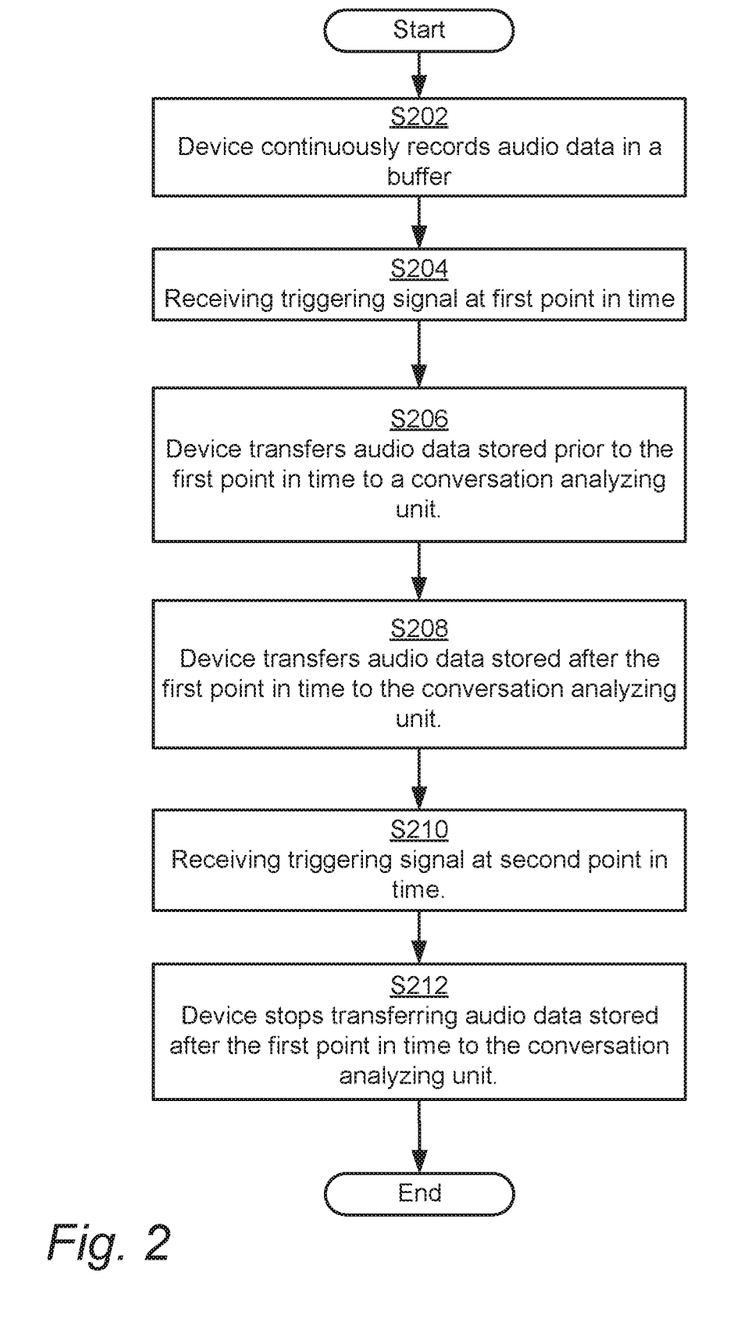
FIG. 2 is a flowchart depicting embodiments of a method involving a smart wearable device.
Figure 3:
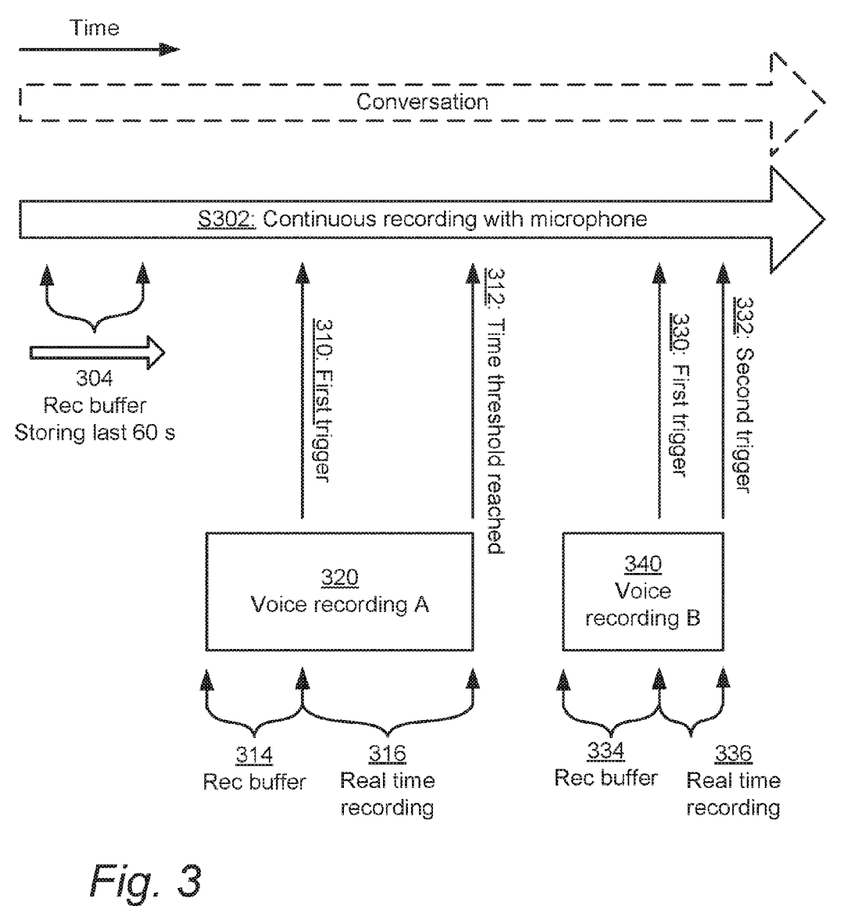
FIG. 3 is a schematic time line view depicting embodiments of a method in a smart wearable device.

FIG. 1 illustrates a smart wearable device 100 adapted to analyze data from a microphone, whereas FIGS. 2 and 3 together illustrates, by way of example, the method used for analyzing data. Examples of a smart wearable device are a smart watch, smart glasses, smart button/key, smart ring, neckless or any other wearable electronic device. The invention is however not limited to this embodiment, and the smart wearable device in the embodiment disclosed herein could be any other electronic device capable of carrying out the actions claimed. Such alternative smart devices are computers, mobile electronic devices such as e.g. mobile telephones, smartphones, handheld computers, laptops and tablets.

The smart wearable device 100 comprises a microphone 102 and a buffer 104, the microphone 102 being arranged to continuously record audio data and the buffer 104 being configured to continuously store the recorded audio data from the microphone 102. The continuous recording may be initiated as soon as the smart wearable device 100 is turned on or initiated by user input. The smart wearable device 100 further comprises a processor 110 arranged to receive a first triggering signal at a first point in time, the first triggering signal pertaining to a request for analyzing the audio data presently being recorded by the microphone 102, wherein a predefined amount of recorded audio data stored prior to the first point in time 314 and audio data stored after the first point in time 316 is transferred to a conversation analyzing unit 108.

The conversation analyzing unit 108 may be part of the smart wearable device 100 but may alternatively be part of a secondary smart device 120 or a remote server 150. Such conversation analyzing unit 108 may be implemented in software utilizing any known algorithm, implementing approaches such as for example a phonetic approach, large-vocabulary continuous speech recognition (LVCSR), Direct Phrase Recognition or extended speech emotion recognition and prediction. The software may be executed by a processor in the smart wearable device 100 and/or the secondary smart device 120 and/or a remote server 150.

The time duration of said amount of audio data may be determined by the first triggering signal at the first point in time 310 and a second triggering signal at a second point in time 312, the second point in time being subsequent to the first point in time. The processor 110 may be adapted to receive the triggering signal at the second point in time S210 defining the end of the audio data stored after the first point in time that will be sent to the conversation analyzing unit S212.

Two examples of voice recordings are illustrated in FIG. 3. In the first example, Voice recording A 320 is initiated by a first trigger 310 at a first point in time, resulting in 60 seconds of already recorded audio data being saved at a Recording buffer 314. Continuous recording goes on for a predefined amount of time given by a time threshold 312. In the second example, Voice recording B 340 is initiated by a first trigger 330, wherein the 60 seconds of already recorded audio data is saved at the Recording buffer 314. The continuous recording goes on until a second trigger 332 is received.

The voice recordings may have different time duration as a result from the real time recording parts 316,336 being of different length. Dependent on the configuration, the recording buffer parts 314,334 may also be of different time duration, for example 30 seconds, 90 seconds or any other suitable time duration. In order to keep power consumption at a lower level, the quality of the recording may be kept at a lower level, just enough for the conversation analysis to work. According to one embodiment, the sound quality of the recording buffer parts 314,334 may be kept at a lower level compared to the real time recording parts 316,336. In this case, the time duration of the recording buffer parts 314,334 may be increased.

As the audio data compression may be different for different embodiments of the invention, a certain physical memory may contain varying total duration of audio data.

The audio data compression may also be automatically adjusted dependent on the situation.

The smart wearable device 100 may further comprise a computer storage medium 106 for long-term storing of the recorded audio data. During a meeting or other type of get-together when the user has heard some subject of interest, he/she presses down a recording button or initiates the first triggering signal in any other way. The smart wearable device 100 tracks back the conversation in the buffer 104, for example, 1 minute back or the whole non-erased buffered data, and then continue recording the conversation until the user presses the button again, or initiates the second triggering signal in any other way, to terminate the interaction, or until a time limit is reached. Both the track-back conversation and the new recorded conversation may be stored in the computer storage medium 106. The memory may be enough for saving for example 10 conversations or even more depending on the implementation. The stored conversations may be sent to a server 150 or Smartphone connected to the smart wearable device for processing immediately or once an internet connection (via Wi-Fi™ Bluetooth™, or any other suitable way) is present.

The first triggering signal may be generated as a result of input from the user in many ways other than pressing a button, such as for example detecting a vibration, detecting a predefined variation in tilt, pressing a touch screen, giving a voice command, tapping, shaking or squeezing the smart wearable device 100. The first triggering signal may also be generated automatically, i.e. without direct commands from a user, for example as a result from identifying a specific piece of data in the output from the conversation analyzing unit. In this case, the conversation analyzing unit may be arranged to continuously receive audio data recorded from the microphone. The second triggering signal may also be generated in any way, including the examples given for generating the first triggering signal. Additionally, the second triggering signal may be generated as a result of reaching a predefined time duration of the recording 312.

The storage capacity of the buffer 104 is time-limited, for example, enough for one or several minutes audio recording, depending on the implementation. The buffer 104 may be arranged to store the recorded audio data on a first-in-first-out, FIFO, basis, which means once the buffer 104 is full, the recorded information stored first starts to be replaced by new recorded information but the rest of the buffer remains untouched until more buffer space is needed. In this way, the buffer 104 is filled once at startup and after that always holds the last minute or whichever time is defined.

As mentioned above, the conversation analyzing unit 108 may in some embodiments be arranged to continuously receiving recorded audio data for the purpose of detecting trigger keywords. The conversation analyzing unit 108 is configured to identify the keywords based on user's subject of interest or preference or history. The conversation analyzing unit 108 may for example use one or more of speech analysis, keyword analysis, semantic analysis, topic analysis, voice detection, natural language processing algorithms, text mining, machine learning models, personalized settings, wherein the conversation analyzing unit outputs data based on the one or more listed operations.

The concept of the invention will now be provided using examples covering some of the embodiments of the invention. During lunch time the user of the smart wearable device 100 hears something of interest in the conversation. This makes him press down a recording button on the smart wearable device 100 to initiate a recording. The smart device tracks back the conversation in the buffer, for example, 1 minute back, and then continue recording the conversation until the user presses the button again to terminate the interaction. A little later his friend, who also has a smart wearable device 100, is sitting listening to one conversation at one end of the table while at the same time a conversation starts at the other end discussing a subject which is of interest to her. As she is not paying attention, she misses the opportunity to actively initiate a recording, but fortunately, the smart wearable device 100, continuously analyzing recorded audio data, picks up keywords related to her interests and initiates a recording automatically. The analysis can also be performed by another device, such as a Smartphone or a cloud server. Thus the recorded audio data may be transmitted to an external processing and/or storage device, wherein the data to be transmitted is the recorded audio data from the microphone and/or data output from the conversation analyzing unit. The conversation analyzing unit 108 may thus be located in such another device, e.g. the secondary device.

In another example embodiment, the recorded conversation itself comprises indications of different subject of interest for different people. The conversation analyzing unit may also process the recorded audio data to extract new keywords from the recorded audio data, the new keywords being added to the existing list of keywords. The word "keyword" should be interpreted broadly, and may comprise single words and/or multi-word strings of any type containing a piece of information.

Figure 4:
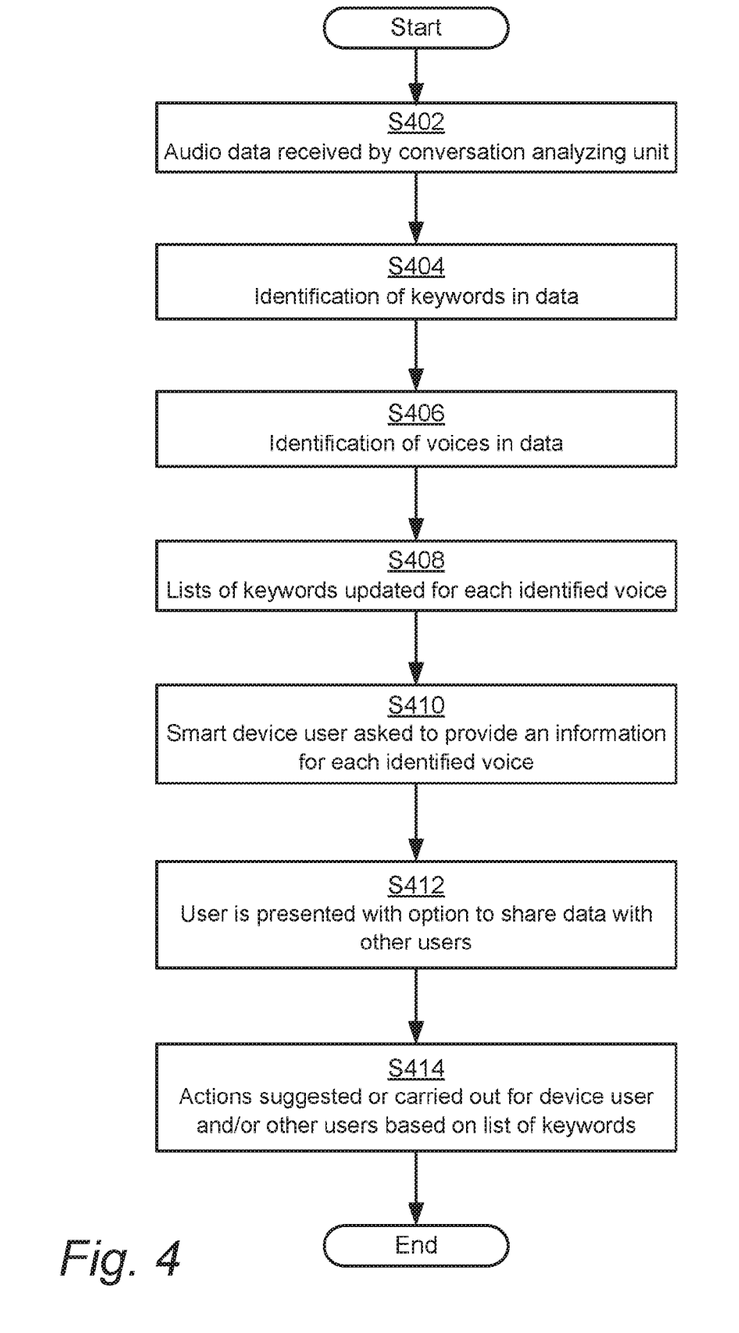
FIG. 4 is a flowchart depicting embodiments of a method involving a smart wearable device.

In one example embodiment, the conversation analysis can provide a proposal of sharing based on the content of conservation, and this will be described in detail with reference to FIGS. 1 and 4. The recorded audio data is received by the conversation analyzing unit 108, wherein the conversation analyzing unit 108 processes the recorded audio data to identify keywords S404 and voices S406 in the recorded audio data and at least some of the new keywords is then associated with a specific voice. This can be done for example by the conversation analyzing unit preparing a list of keywords for each voice identified S408 in the audio data. The user of the smart wearable device is then asked to provide an information for each voice identified S410. The information may for example be an address information, e.g. phone number, email address etc. The information may also be e.g. a user name such as a Skype™ or Facebook™ user name. This means that keywords can be user-specific and may be used to trigger events differently dependent on the user. The method further comprises presenting for the user the option of sharing recorded audio data and/or data output from conversation analyzing unit after having processed said recorded audio data, to a person associated with the voice S412. The user may then choose whether or not to allow sharing. In other example embodiments, it is not required that the user actively allows sharing or other action taken. The word 'user' should be interpreted broadly, and may comprise persons using a smart wearable device 100, persons using a secondary smart device 120, persons associated with user's accounts on internet resourses such as e.g. Facebook™ Youtube™, and persons using at least parts of the method claimed.

An example will now be given for the method of sharing. For example, the recorded audio data may contain the information that Nils likes watching Jackie-Chan's movies. The conversation analyzing unit 108 interprets the audio data and adds a new user-specific keyword to the existing list of keywords S408. The conversation analyzing unit 108 is from now on able to trigger on new recorded audio data containing information relevant to the new keyword. The requirements for the recorded audio data to be regarded as relevant may be set differently. It could be set narrow, such as requiring the subject identified in the recorded audio data to be related only to Jackie Chan's movies, or Jackie Chan himself. It may also be defined broader, such as requiring the subject to be action movies, new movies or movies in general. The data output from the conversation analyzing unit 108 is also stored in the computer storage medium 106 and may be available to transfer or share.

Now returning to FIG. 1, the smart wearable device 100 may further comprise a wireless transferring circuitry 112 arranged to transmit the recorded audio data to the secondary smart device 120. In one example embodiment, the smart wearable device 100 is paired with a secondary smart device 120 for example, a Smartphone or a smart TV. According to one embodiment, once the smart wearable device 100 is approaching the paired secondary smart device 120, the smart wearable device may be initiated to transfer data from the computer storage medium 106 in the smart wearable device 100 to an internet 140 account (Gmail™, Facebook™, Lifelog™, etc.) through the connectivity interface 126 of the secondary smart device 120. Data stored in the internet account may then be ready to be retrieved.

In another example embodiment, the smart wearable device is directly connected to a cloud service or the Internet 140 via radio communication for example LTE, 3G or other local connectivity for example, Body Area Network, Wireless Local Network, Near Field Communication, or Bluetooth™ without using a secondary smart device.

The processed data output from the conversation analyzing unit 108 can be used for triggering content search on internet and/or specific databases, wherein the result from the content search is stored for later retrieval. The processed data output can also be used for generating invitations and/or updates to information stored pertaining to persons other than the user 414. The content search can be performed for example using the Google™ search engine or any other suitable search engine, as well as service providers such as e.g. NetFlix™, Youtube™, etc. There are already many existing search method or algorithms for finding an item with specified properties among a collection of items stored in a database, for example, combinatorial optimization, hashing, internet search algorithms, string matching algorithms etc. The specific properties could be the keywords identified by the conversation analysis. The result of the content search may be a list of links to the relevant contents from a database (Youtube™ Netflix™) or internet which matches with the keywords from the conversation.

All these matched relevant contents may be retrievable by the user or any device paired with the smart wearable device 100 or the user account. The retrieval may be aided by automatic means. In one example embodiment, the occurrence of a new piece of matched relevant content may initiate a reminder, such as e.g. a pop-up notice or an e-mail. For example, a user may be reminded about an upcoming football match, the reminder being initiated as a result from combining the user's interest for football with an internet search for upcoming matches in the neighborhood, the user's interest for football being determined by the output from the conversation analyzing unit 108.

In another example embodiment, a suggestion of sharing certain information with friends or colleagues is initiated. For example, the user may be asked to recommend a book or movie to his/her friends/colleagues, the suggestion being a result from combining information about the book or movie title with an internet search, the information about the book or movie title being determined by the output from the conversation analyzing unit 108. If, for example, the smart wearable device 100 is paired with a smart TV which has subscription to Netflix™, the smart TV may list out the recommended movie with a direct link to the movie. As an example, Kate describes a movie for Jane, and Jane initiates a recording by pressing a button on her smart wearable device 100 (the triggering may be achieved in any other way according to above). The buffer contains e.g. the last 60 seconds of conversation which is kept and another 60-120 seconds (for example) is added to the recording that will be sent for analysis. The analysis can be performed in the smart wearable device 100, in a connected secondary smart device 120, or on a server in the cloud 150. The recording may be sent to the server immediately or at a later time, when there is an appropriate connection to the server. The voice identification, in combination with a smart conversation analysis yields a result that is stored to Jane's profile (e.g. Facebook™, Youtube™ etc.). The information will be presented to Jane, via for example her smart phone or tablet, at a later moment, when she may have to time to watch the movie.

In another example, John has soccer practice and the coach tells him about the game on Sunday. The conversation analyzing unit may be present in the smart wearable device and the phrase "Don't forget" could trigger a recording to start and send the conversation for analysis. Based on prior knowledge, that John's mother always takes him to the games, some information can be automatically added to his mother's calendar, and some other information may be proposed to be sent to Facebook™ friends or to his father. It is also envisaged that other connected devices may utilize such information, for example a smart laundry machine may tell anyone in the household that uses the washing machine to include John's soccer jersey before Sunday.

In one example embodiment, suggestions and/or actions are triggered as a result from a combination of output from the conversation analyzing unit 108 and one or more from geographical coordinate information, calendar information, social network status, weather information and detected sensor data pertaining to the user.

Examples of these sources of information are user location (in a new town that someone else has talked about a couple of weeks ago), time (e.g. lunch time, weekend evening), calendar, mood, or even biomedical conditions (blood sugar, heart rate). For example, a famous Japanese restaurant in was mentioned during today's coffee break. On Saturday two weeks after, the user happens to pass by the restaurant, and his smart phone 120 displays a reminder that he is currently in a neighborhood of the restaurant. In another example, a smart sensor device in the user's smart wearable device 100 detects the user's low blood sugar level and in combination with the retrieved information about the restaurant, a suggestion about the restaurant is displayed up in his smart phone, computer, tablet etc. More smart sensors may be needed for collecting relevant information and triggering the information retrieval.

The embodiments herein are not limited to the above described examples. Various alternatives, modifications and equivalents may be used. For example, the recorded audio data may comprise more than vocal information, such as specific non-vocal sounds and/or music, wherein the conversation analyzing unit may be able to make use of also the non-vocal audio data. Therefore, this disclosure should not be limited to the specific form set forth herein. This disclosure is limited only by the appended claims and other embodiments than the mentioned above are equally possible within the scope of the claims.

The devices (e.g. smart wearable device, or smart phone) and methods disclosed hereinabove may be implemented as software, firmware, hardware or a combination thereof. In a hardware implementation, the division of tasks between functional units or components referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

What is claimed is:

1. A method for analyzing audio data collected by a microphone, the microphone being arranged to continuously collect the audio data, the method comprising:
   recording the collected audio data in a buffer,
   receiving the collected audio data by a conversation analyzing unit,
   identifying, by the conversation analyzing unit, a specific piece of data in the received audio,
      wherein the specific piece of data is an occurrence of a keyword from an existing list of keywords,
      wherein the conversation analyzing unit uses one or more operations selected from speech analysis, keyword analysis, semantic analysis, topic analysis, voice detection, natural language processing algorithms, text mining, machine learning models, and personalized settings,
      wherein the conversation analyzing unit outputs data based on the used one or more operations,
      wherein the conversation analyzing unit processes the collected audio data to extract new keywords from the recorded audio data, the new keywords being added to an existing list of keywords,
      wherein the conversation analyzing unit processes the collected audio data to identify voices in the collected audio data, and
      wherein at least some of the new keywords are associated with a specific voice,
   receiving, as a result of the identifying the specific piece of data, a first triggering signal at a first point in time, the first triggering signal pertaining to a request for analyzing the audio data presently being collected by the microphone,
   transferring, in response to receiving the first triggering signal, a predefined amount of the audio data recorded in the buffer prior to the first point in time, and audio data collected after the first point in time, to the conversation analyzing unit for further analyzing, and
   presenting for a user the option of sharing collected audio data and/or data output from the conversation analyzing unit after having processed said collected audio data, to a person associated with the voice.

2. A method according to claim 1, further comprising:
   receiving a second triggering signal at a second point in time, the second point in time being subsequent to the first point in time, and
   stopping the transferring of the collected audio data upon receipt of the second triggering signal.

3. A method according to claim 1, wherein the buffer is arranged to store the recorded audio data on a first-in-first-out (FIFO) basis.

4. A method according to claim 1, wherein the first triggering signal is also generated as a result of at least one of:
   detecting pressing of a button,
   detecting a vibration,
   detecting a predefined variation in tilt of a device comprising the microphone,
   detecting pressing of a touch screen of a device comprising the microphone,
   detecting tapping of the device comprising the microphone,
   detecting shaking of the device comprising the microphone, or
   detecting squeezing of the device comprising the microphone.

5. A method according to claim 2, wherein the second triggering signal is generated as a result of at least one of:
   detecting pressing of a button,
   detecting a vibration,
   detecting a predefined variation in tilt of a device comprising the microphone,
   detecting pressing of a touch screen of a device comprising the microphone,
   detecting tapping of the device comprising the microphone,
   detecting shaking of the device comprising the microphone,
   detecting squeezing of the device comprising the microphone,
   identifying a specific piece of data in the output from the conversation analyzing unit, or
   reaching a predefined time duration of the recording.

6. A method according to claim 1, further comprising transmitting data to an external processing and/or storage device, wherein the data to be transmitted is the collected audio data from the microphone and/or data output from the conversation analyzing unit.

7. A method according to claim 1, wherein the processed data output from the conversation analyzing unit is used for at least one of:
   triggering a content search on internet and/or specific databases, wherein the result from the content search is stored for later retrieval, or
   generating invitations and/or updates to information stored pertaining to persons other than the user.

8. A method according to claim 1, wherein suggestions and/or actions are triggered as a result from a combination of output from the conversation analyzing unit and one or more of:
   geographical coordinate information,
   calendar information,
   social network status, weather information,
current user activity, or
detected sensor data pertaining to the user.

9. A method according to claim 1 wherein at least part of the collected audio data is intermediately stored in a second buffer before the transferring to the conversation analyzing unit.

10. A non-transitory computer-readable storage medium storing instructions that, when executed by a device having processing capability, support analysis of audio data collected by a microphone, the instructions comprising executable logic to:
record the collected audio data in a buffer,
receive the collected audio data by a conversation analyzing unit,
identify, by the conversation analyzing unit, a specific piece of data in the received audio, wherein the specific piece of data is an occurrence of a keyword from an existing list of keywords,
wherein the conversation analyzing unit uses one or more operations selected from speech analysis, keyword analysis, semantic analysis, topic analysis, voice detection, natural language processing algorithms, text mining, machine learning models, and personalized settings,
wherein the conversation analyzing unit outputs data based on the used one or more operations,
wherein the conversation analyzing unit processes the collected audio data to extract new keywords from the recorded audio data, the new keywords being added to an existing list of keywords,
wherein the conversation analyzing unit processes the collected audio data to identify voices in the collected audio data, and
wherein at least some of the new keywords are associated with a specific voice,
receive, as a result of identifying the specific piece of data, a first triggering signal at a first point in time, the first triggering signal pertaining to a request for analyzing the audio data presently being collected by the microphone,
transfer, in response to receiving the first triggering signal, a predefined amount of the audio data recorded in the buffer prior to the first point in time, and audio data collected after the first point in time, to the conversation analyzing unit for further analyzing, and
present for a user the option of sharing collected audio data and/or data output from the conversation analyzing unit after having processed said collected audio data, to a person associated with the voice.

11. A device for analyzing audio data collected by a microphone, comprising:
a microphone being arranged to collect audio data,
a buffer configured to record the collected audio data,
a conversation analyzing unit configured to receive the collected audio data and identify a specific piece of data in the received audio,
wherein the specific piece of data is an occurrence of a keyword from an existing list of keywords,
wherein the conversation analyzing unit uses one or more operations selected from speech analysis, keyword analysis, semantic analysis, topic analysis, voice detection, natural language processing algorithms, text mining, machine learning models, and personalized settings,
wherein the conversation analyzing unit outputs data based on the used one or more operations,
wherein the conversation analyzing unit processes the collected audio data to extract new keywords from the recorded audio data, the new keywords being added to an existing list of keywords,
wherein the conversation analyzing unit processes the collected audio data to identify voices in the collected audio data, and
wherein at least some of the new keywords are associated with a specific voice, and
a processor arranged to:
receive, as a result of identifying the specific piece of data, a first triggering signal at a first point in time, the first triggering signal pertaining to a request for analyzing the audio data presently being collected by the microphone,
transfer, in response to receiving the first triggering signal, a predefined amount of the audio data recorded in the buffer prior to the first point in time, and audio data collected after the first point in time, to the conversation analyzing unit for further analyzing, and
present for a user the option of sharing collected audio data and/or data output from the conversation analyzing unit after having processed said collected audio data, to a person associated with the voice.

12. A device according to claim 11, wherein the collected audio data is transferred to at least one of:
a computer storage medium, or
a wireless transferring circuitry arranged to transmit the recorded audio data to a secondary device.

* * * * *